(12) United States Patent
Ganji et al.

(10) Patent No.: US 12,049,845 B2
(45) Date of Patent: Jul. 30, 2024

(54) VARIABLE BLEED VALVES WITH STRUTS FOR AERODYNAMIC STABILITY

(71) Applicant: General Electric Company, Schenectady, NY (US)

(72) Inventors: Nageswar Rao Ganji, Bengaluru (IN); Ravindra Shankar Ganiger, Bengaluru (IN); Hiranya Kumar Nath, Bengaluru (IN); Ambika Shivamurthy, Bengaluru (IN); Trevor H. Wood, Niskayuna, NY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 17/951,619

(22) Filed: Sep. 23, 2022

(65) Prior Publication Data

US 2024/0052778 A1 Feb. 15, 2024

(30) Foreign Application Priority Data

Aug. 9, 2022 (IN) .............................. 202211045383

(51) Int. Cl.
*F02C 6/08* (2006.01)
*F01D 17/10* (2006.01)
*F01D 25/04* (2006.01)

(52) U.S. Cl.
CPC .............. *F02C 6/08* (2013.01); *F01D 17/105* (2013.01); *F01D 25/04* (2013.01); *F05D 2250/131* (2013.01); *F05D 2260/606* (2013.01); *F05D 2260/963* (2013.01)

(58) Field of Classification Search
CPC .......... F01D 25/04; F01D 17/105; F02C 9/18; F02C 6/08; F05D 2260/606; F05D 2260/963

See application file for complete search history.

(56) References Cited

U.S. PATENT DOCUMENTS

| | | | |
|---|---|---|---|
| 6,565,313 B2 | 5/2003 | Nikkanen et al. | |
| 7,017,706 B2 | 3/2006 | Brown et al. | |
| 8,128,347 B2 | 3/2012 | Sokhey | |
| 8,511,096 B1 * | 8/2013 | Haugen ..................... | F02C 7/24 |
| | | | 60/785 |
| 9,175,577 B2 | 11/2015 | Papamoschou et al. | |
| 9,518,513 B2 * | 12/2016 | Pritchard, Jr. ........... | F02C 9/18 |
| 9,982,598 B2 | 5/2018 | Pritchard, Jr. et al. | |
| 10,024,228 B2 | 7/2018 | Gong et al. | |
| 10,287,992 B2 | 5/2019 | Tan et al. | |
| 10,513,984 B2 | 12/2019 | Kim et al. | |

(Continued)

FOREIGN PATENT DOCUMENTS

| | | | | |
|---|---|---|---|---|
| EP | 2184448 | | 5/2010 | |
| GB | 2381832 A | * | 5/2003 | .............. F01D 9/06 |
| JP | 2009209976 | | 9/2009 | |

*Primary Examiner* — Topaz L. Elliott
(74) *Attorney, Agent, or Firm* — Hanley, Flight & Zimmerman, LLC

(57) ABSTRACT

Variable bleed valves with struts for aerodynamic stability are described. An apparatus described herein includes a variable bleed valve port, and a strut disposed within the variable bleed valve port, the strut defining a plane and a plurality of holes disposed perpendicularly to the plane, the plurality of holes disposed in a pattern to dampen an acoustic response associated with the variable bleed valve port.

20 Claims, 6 Drawing Sheets

(56) References Cited

U.S. PATENT DOCUMENTS

| | | | |
|---|---|---|---|
| 2008/0236137 A1* | 10/2008 | Julliard | F02K 3/06 181/213 |
| 2008/0295518 A1* | 12/2008 | Reba | F02C 7/24 60/725 |
| 2009/0025393 A1* | 1/2009 | Sheldon | F02C 7/045 60/725 |
| 2010/0115963 A1* | 5/2010 | Kirby | F01D 17/105 60/785 |
| 2010/0126182 A1* | 5/2010 | Hoover | F02K 3/06 60/785 |
| 2012/0070271 A1 | 3/2012 | Urban et al. | |
| 2015/0139775 A1* | 5/2015 | Kumar | F01D 9/041 415/121.2 |
| 2016/0153311 A1* | 6/2016 | Little | F04D 27/0215 415/119 |
| 2016/0265442 A1* | 9/2016 | Beecroft | F01D 17/105 |
| 2022/0010731 A1* | 1/2022 | Bifulco | F01D 5/16 |
| 2022/0074348 A1* | 3/2022 | Johnson | F02C 7/24 |
| 2022/0195878 A1* | 6/2022 | VanDeMark | F01D 17/145 |
| 2022/0282627 A1* | 9/2022 | Wickersham | F02C 9/18 |
| 2023/0151769 A1* | 5/2023 | Laffay | F02K 3/075 60/725 |

* cited by examiner

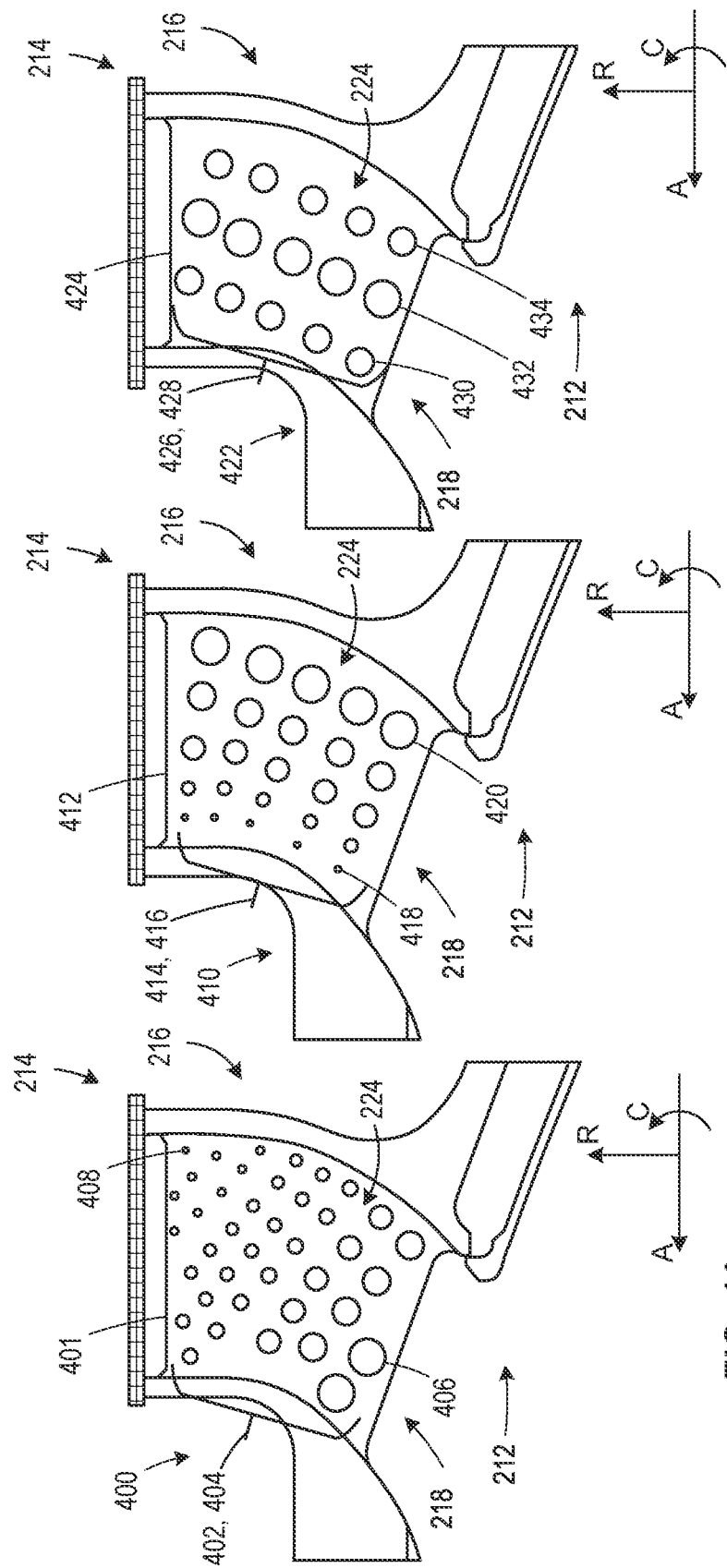

VARIABLE BLEED VALVES WITH STRUTS FOR AERODYNAMIC STABILITY

RELATED APPLICATION

This patent claims priority to Indian Patent Application No. 202211045383, filed on Aug. 9, 2022, which is incorporated herein by reference in its entirety.

FIELD OF THE DISCLOSURE

This disclosure relates generally to turbine engines and, more particularly, to aerodynamically stable variable bleed valves in turbine engines.

BACKGROUND

Turbine engines are some of the most widely-used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

BRIEF DESCRIPTION OF THE DRAWINGS

FIG. 4A is an illustration of an example variable bleed valve port including the strut of FIG. 3 including a first pattern of holes.

FIG. 4B is an illustration of an example variable bleed valve port including the strut of FIG. 3 including a second pattern of holes.

FIG. 4C is an illustration of an example variable bleed valve port including the strut of FIG. 3 including a third pattern of holes.

Figure 1:
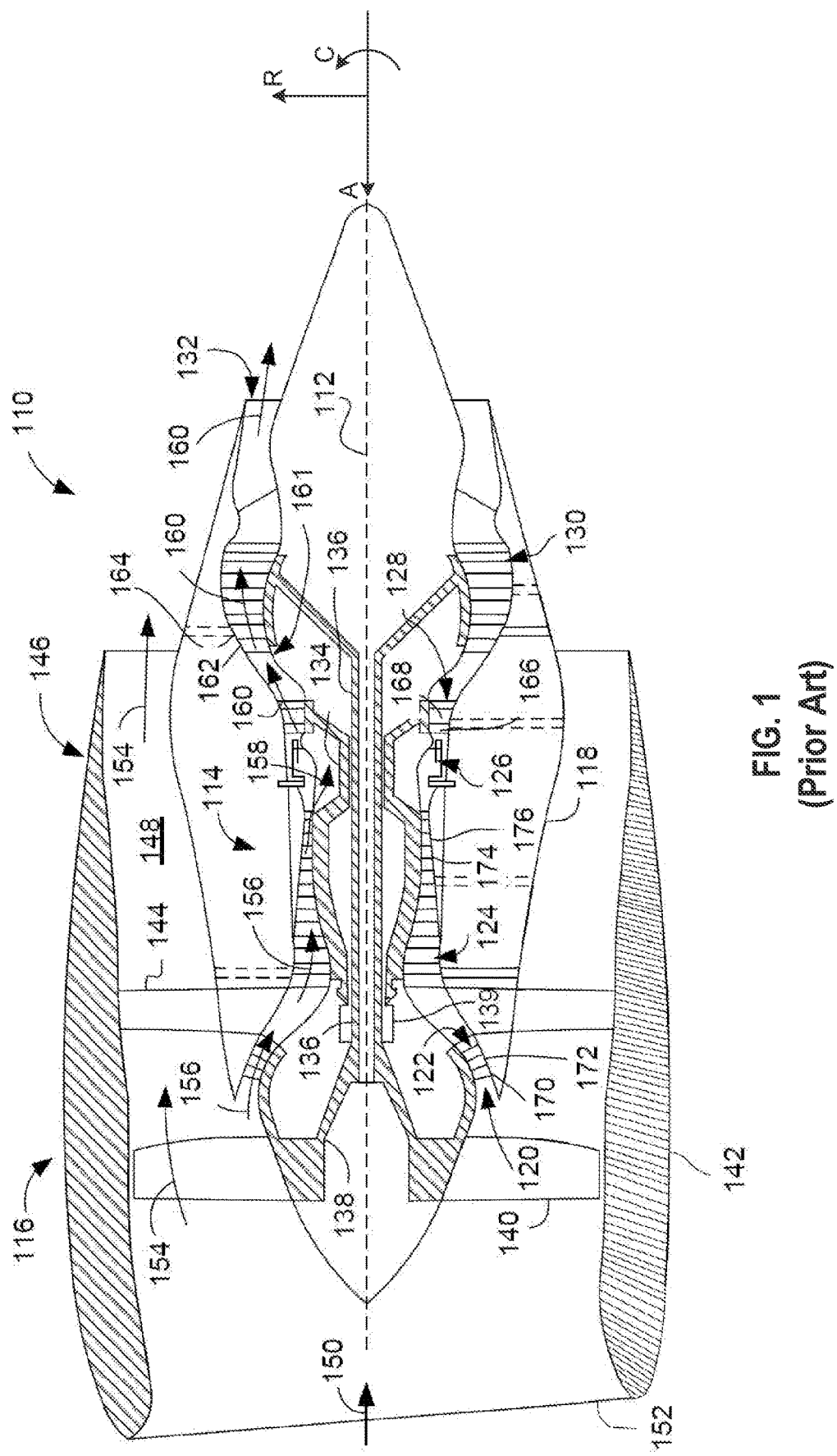
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or as terms, such "about", "approximately", and "substantially", are not to be limited to the precise value specified. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with a set of axes including the axial axis A, the circumferential axis C, and the radial axis R.

The terms "hole" and "opening" are used interchangeable to refer to apertures in a structure. Generally, the term "hole" is used to refer to apertures on the external face of the struts described herein and the term "opening" is used to refer to apertures in the internal structure of the struts described herein. However, different instances of these terms should not be taken to limit the scope of the subject matter described therewith. Instead, the terms are used for clarity and/or descriptive purposes only.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

In certain gas turbine operating conditions, the rotor blade tips of the low-pressure compressor (LPC) cause turbulent airflow that generates an acoustic resonance when the airflow encounters the cavity of a variable bleed valve. These generated acoustic resonant tones can cause negative effects (e.g., crack formation, fracture, etc.) in the other components of the LPC. Examples disclosed herein include variable bleed valve cavities with struts that include (e.g., define, etc.) variably sized holes that reduce the cavity negative effects of resonance. Examples disclosed herein include struts that extend along the axial length of the cavity. The variably sized holes disclosed herein are disposed in patterns that make different acoustic frequencies to mitigate acoustic effects associated with the cavity.

A turbine engine, also referred to herein as a gas turbine engine, is a type of internal combustion engine that uses atmospheric air as a moving fluid. In operation, atmospheric air enters the turbine engine via a fan and flows through a compressor section where one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow through a turbine section, causing rotating blades of one or more turbines to spin. The rotating blades of the turbine produce a spool work output that powers a corresponding compressor. The spool is a combination of the compressor, a shaft, and the turbine. Turbine engines often include a plurality of spools, such as a high pressure spool (e.g., HP compressor, shaft, and turbine) and a low-pressure spool (e.g., LP compressor, shaft, and turbine). A turbine engine can include one spool or more than two spools in additional or alternative examples.

During low-speed operation of the turbine engine (e.g., during start-up and/or stopping), the equilibrium of the engine is adjusted. In many situations, a delay is required for the spool(s) to adapt (e.g., a time for a rotational speed to adjust for a new equilibrium). For example, if the fuel flow rate is reduced so as to cause the turbine to reduce the power produced and the mass flow through the engine, the HP and LP spools of the engine will decelerate. This deceleration will occur at different rates however, which can cause both the LP and HP compressors to not operate at expected conditions. The mismatched speed of the compressor sections can potentially lead to compressor instabilities, such as compressor stall and/or compressor surge. Compressor stall is an abnormal airflow resulting from the aerodynamic stall of rotor blades within the compressor. Compressor stall causes the air flowing through the compressor to slow down or stagnate. In some cases, the disruption of airflow as the air passes through various stages of the compressor can lead to compressor surge. Compressor surge refers to a stall that results in disruption (e.g., complete disruption, majority disruption, other partial disruption, etc.) of the airflow through the compressor.

A variable bleed valve (VBV) is often integrated into a compressor to increase efficiency and limit possible stalls. The VBV enables the turbine engine to bleed air from a compressor section of the turbine engine during operation. An example VBV assembly includes a VBV port (e.g., opening, air bleed slot, etc.) integrated into a compressor casing that opens via actuation of a VBV door. The VBV is configured as a door that opens to provide a bleed flow path to bleed off compressed air between a low-pressure compressor and high-pressure compressor of a gas turbine. For example, the VBV door may be actuated during a speed-speed mismatch between the LP spool and the HP spool from their design speed equilibrium. For example, during low speed operation and/or acceleration/deceleration transients, the HP spool may spin at a lower speed than the nominal equilibrium speed than the LP spool. Opening the VBV port allows the LP spool to maintain its speed while reducing the amount of air that is flowing through the HP compressor by directing some of the air flow to other engine components (e.g., the bypass, the turbine, the exhaust area, etc.). The VBV door enables the LP spool (e.g., booster) to operate on a lower operating throttle and reduces the likelihood of a potential instability and stall conditions.

When a VBV is in a closed position, the VBV door may not be flush with the compressor casing, resulting in a bleed cavity that is open to a main flow path within the compressor. As air flows through the compressor, the airflow may encounter an upstream edge of the bleed cavity. In some examples, a shear layer of the airflow separates from this upstream edge and impinges on a downstream edge of the VBV port, resulting in acoustic wave feedback. When the feedback resonates with the bleed cavity, energetic acoustic tones emanate from the bleed cavity and interact with surrounding hardware. The acoustic tones often resonate with other mechanical components of the turbine engine, which can lead to vibrations that increase stress levels, induce crack formation, and/or cause other mechanical faults in the LPC components.

Examples disclosed herein overcome the above-noted deficiencies and include struts disposed in VBV cavities with multiple through-holes. The example through-holes described herein are of various sizes and disposed in particular patterns to alter the cavity response to avoid any resonance effects. Examples disclosed herein dampen the acoustic response of the VBV cavity, thereby reducing the likelihood that resonance-induced vibrations induce crack formations and/or other mechanical faults in LP compressor rotor components. In some examples disclosed herein, the variably sized holes in the strut act as Helmholtz resonators to dampen the resonant acoustic response of the VBV cavity. In some examples disclosed herein, the struts extend to be adjacent to the main flow path of the engine, thereby disrupting the shear layers associated with the VBV cavity. Some examples disclosed herein include struts with hollow cross-sections including internal cavity structure(s). In some such examples disclosed herein, the internal cavity structures can include a plurality of openings therein to further dampen of the resonant acoustic response of the VBV cavity.

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a circumferential direction C, and a radial direction R.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low-pressure compressor 122 ("LP compressor 122") and a high pressure compressor 124 ("HP compressor 124"), a combustion section 126, a turbine section having a high pressure turbine 128 ("HP turbine 128") and a low-pressure turbine 130 ("LP turbine 130"), and an exhaust section 132. A high pressure shaft or spool 134 ("HP shaft 134") drivingly couples the HP turbine 128 and the HP compressor 124. A low-pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative (e.g., partially supported, etc.) to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

Figure 2:
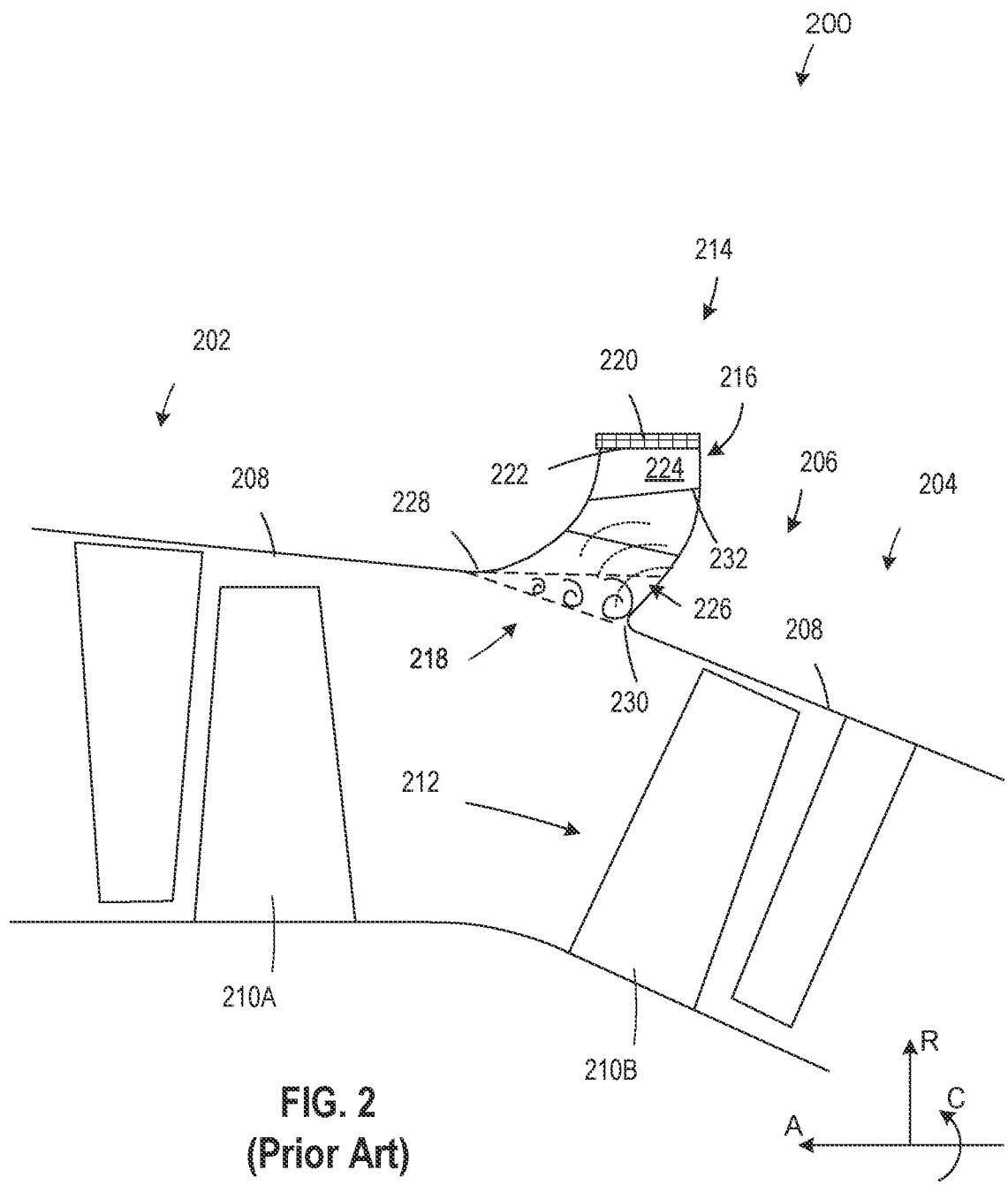
FIG. 2 is an illustration of a prior variable bleed valve port.

FIG. 2 is a partial cross-sectional view of a prior compressor 200 of a turbine engine (e.g., turbofan engine 110 of FIG. 1), including an example LP compressor (e.g., booster) stage 202 and an example HP compressor stage 204. FIG. 2 illustrates the example compressor 200 at a transition point 206 between the booster stage 202 and the HP compressor stage 204. The compressor 200 includes an example casing 208. In FIG. 2, the casing 208 surrounds the booster stage 202 and the HP compressor stage 204. In additional or alternative examples, the booster stage 202 and the HP compressor stage 204 have distinct casings 208 connected via a linkage mechanism. The compressor 200 includes first blades 210A and second blades 210B. In operation, the blades (e.g., the blades 210A, 210B, etc.) of the compressor 200 spins, impelling air downstream. The casing 208 defines an example mainstream flow path 212 (e.g., a first flow path, etc.) for airflow through compressor 200 (e.g., and the turbofan engine 110).

FIG. 2 illustrates a variable bleed valve (e.g., VB valve, VBV, etc.) 214, including an example VBV port (e.g., passage, opening, duct, etc.) 216 that defines an example bleed flow path (e.g., secondary flow path) 218 and an example VBV door 220 located at a VBV port exit 222. The VBV 214 can be actuated via an actuator (not illustrated). The actuator can move the VBV door 220 between an open position (e.g., to bleed air from the booster stage 202, etc.) and a closed position.

In the closed position, the VBV door 220 is positioned at the VBV port 216 in a manner that produces an example bleed cavity (e.g., open space, chamber, etc.) 224. In the closed position, the VBV door 220 covers the VBV port exit 222, closing off the VBV port 216. In FIG. 2, the VBV 214 includes a prior strut 232 that structurally supports the bleed cavity 224. The resultant bleed cavity 224 disrupts the airflow as air flows through the mainstream flow path 212. The disruption of the airflow leads to acoustic resonance, compressor instabilities, and/or other issues. For example, a shear layer 226 of the mainstream airflow can separate as it reaches an upstream edge (e.g., end, lip, etc.) 228 of the VBV port 216. As the shear layer 226 convects downstream, the shear layer 226 impinges upon a downstream edge (e.g., end, lip, etc.) 230 of the VBV port 216, leading to feedback in the form of acoustic pressure waves. When the pressure wave feedback causes vorticity to shed into the shear layer in phase, resonant acoustic energy builds within the bleed cavity, which can resonate with other mechanical components of the turbine engine and leading to the compressor instabilities and/or mechanical failure. Advantageously, the examples of FIGS. 3-6B eliminate or otherwise dampen the acoustic resonance.

Example VBVs are disclosed below in conjunctions with FIGS. 3-6B that are similar to the VBV 214 of FIG. 2. As such, the same reference numbers used for the structures shown in FIG. 2 are used for similar or identical structures in FIGS. 3-6. Further, details of the parts (e.g., VBV port 216, bleed flow path 218, VBV door 220, VBV port exit 222, bleed cavity 224, upstream edge 228, downstream edge 230, etc.) are not repeated in connection with FIGS. 3-6B. Similar to FIG. 2, examples below can be integrated into a casing 208 of a compressor 200, which defines a mainstream flow path 212 for airflow through the turbofan engine 110.

Figure 3:
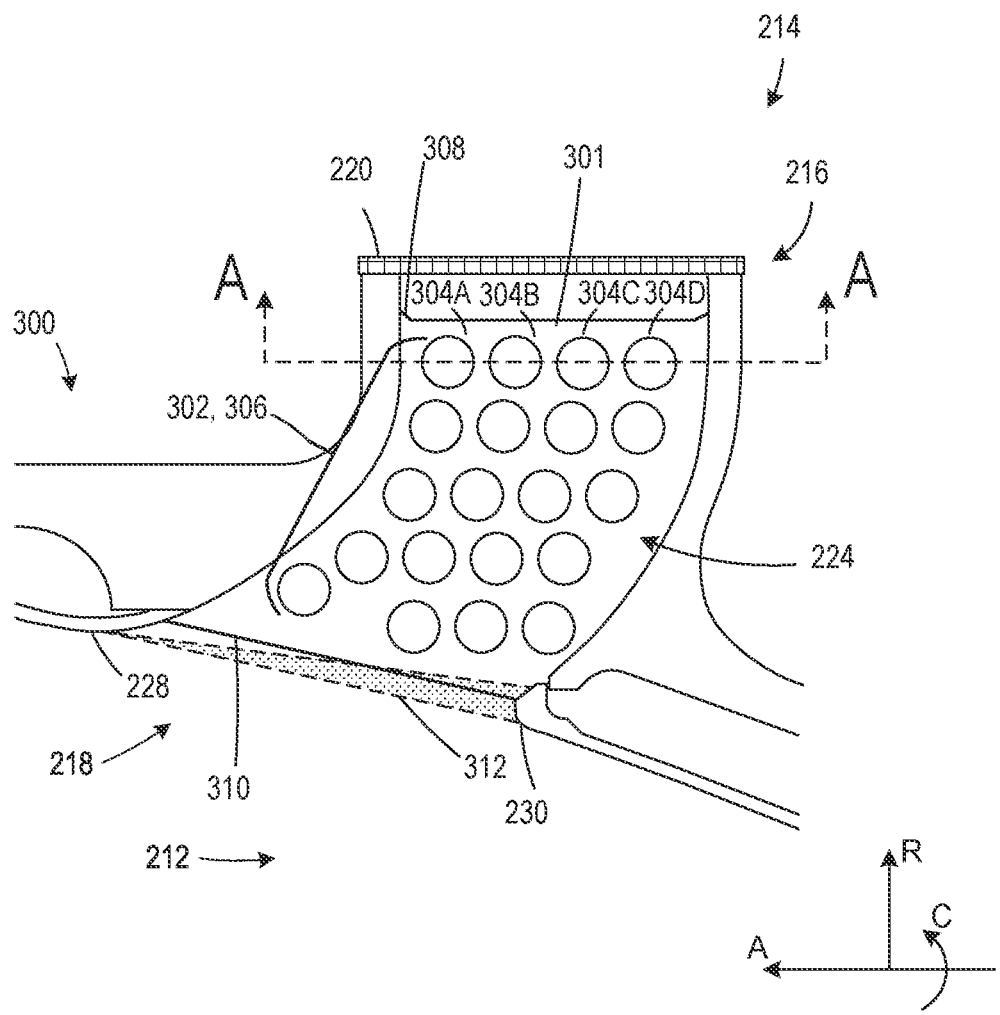
FIG. 3 is an illustration of an example variable bleed valve port and casing including a strut with through holes implemented in accordance with the teachings of the disclosure.

FIG. 3 is a partial cross-sectional view of an example compressor 300 of a turbine engine (e.g., turbofan engine 110 of FIG. 1) implemented in accordance with the teachings of this disclosure. In the illustrated example of FIG. 3, the compressor 300 includes the variable bleed valve 214 (e.g., VB valve, VBV, etc.) of FIG. 2, including the VBV port 216 of FIG. 2 that defines the bleed flow path 218 of FIG. 2 and the example VBV door 220 of FIG. 2 located at the example VBV port exit 222 of FIG. 2. In the illustrated example of FIG. 3, the VBV port 216 includes an example strut 301 extending axially between the edges 228, 230. The strut 301 includes an example plurality of holes 302 including an example first hole 304A, an example second hole 304B, an example third hole 304C, and an example fourth hole 304D. In the illustrated example of FIG. 3, the plurality of holes 302 is arranged in an example first pattern 306. In the illustrated example of FIG. 3, the strut 301 has an example first edge 308 and an example second edge 310. In the illustrated example of FIG. 3, an example disturbed shear layer 312 extends between the upstream edge 228 of FIG. 2 and the downstream edge 230 of FIG. 2.

The strut 301 is a structural member (e.g., an airfoil, a blade, a plate, etc.) disposed within the VBV cavity 224. In the illustrated example of FIG. 3, the first edge 308 (e.g., a top edge, etc.) of the strut 301 is disposed adjacent to the VBV door 220 and a second edge 310 (e.g., a bottom edge, etc.) is disposed adjacent to the edges 228, 230 of the VBV 214. In the illustrated example of FIG. 3, the second edge 310 of the strut 301 disrupts the separation of the boundary layer associated with the main flow path 212, which generates the disrupted shear layer 312 and reduces the negative acoustic effects associated therewith. In other examples, the second edge 310 of the strut can be further from the edges 228, 230 of the VBV 214. In some examples, the strut 301 can increase the mechanical strength of the VBV 214, the VBV port 216 and/or the compressor 300. In some examples, the strut 301 is a solid member. In other examples, the strut 301 is a hollow member. Example implementations of a solid strut and a hollow strut are described below in conjunction with FIGS. 5A and 5B.

In the illustrated example of FIG. 3, each of the plurality of holes 302 (e.g., including the holes 304A, 304B, 304C, 304D, etc.) has a uniform size, shape and geometry. In the illustrated example of FIG. 3, each of the plurality of holes 302 is circular and extends circumferential-wise through the strut. In other examples, the plurality of holes 302 can have any other suitable size and shape (e.g., elliptical, polygonal, etc.). In the illustrated example of FIG. 3, each of the holes 302 are through holes. In other examples, if the strut 301 has a solid cross-section, some or all of the holes 302 can be blind holes. Additionally of alternatively, if the strut 301 has a hollow cross-section, some or all of the holes 302 can be blind holes (e.g., not fully through the wall of the strut 301, etc.) and/or some or all of the holes 302 can extend through one of the walls of the strut, without a corresponding aligned hole on the other face of the strut 301. In the illustrated example of FIG. 3, the pattern 306 of the plurality of holes 302 has a uniform spacing along the axial axis and the radial axis. Example struts including holes with a non-uniform pattern and/or size are described below in conjunction with FIGS. 4A-4C.

As the air moves with (e.g., the oscillates, pulsates at/near the resonant frequency(ies) of the VBV cavity 224 via the secondary flow path 218, the air passes through the holes 302 of the strut 301. When portions of the air in the secondary flow path 218 enter the holes 302 and/or interact with air inside the holes 302, the compressibility of this air causes the air to vibrate, thereby modifying the acoustic response of the VBV cavity 224. That is, by modifying the size and location of the holes 302, the acoustic response of the VBV can be tuned to dampen and avoid negative acoustic response and/or negative resonant effects associated with compressor components.

FIG. 4A is an illustration of another example compressor 400 including another example strut 401 including a plurality of holes 402 arranged in an example second pattern 404. In the illustrated example of FIG. 4A, the plurality of holes 402 include an example first hole 406 and an example second hole 408. In the illustrated example of FIG. 4A, the pattern 404 is such that the holes 402 gradually get smaller further from the main flow path 212 along the radial axis and downstream of the bleed cavity. In other examples, the pattern 404 can be such that a size of each of the holes 402 gradually increases from the main flow path 212 along the radial axis and downstream of the bleed cavity. In the illustrated example of FIG. 4A, the first hole 406 has a larger cross-sectional area than the second hole 408. The first hole 406 is upstream of and radially closer to the engine centerline than the second hole 408 (e.g., the first hole 406 is comparatively adjacent to the main flow path 212 and the second hole 408 is comparatively distal to the main flow path 212, etc.). Depending on the material and geometric features of the compressor 400, the pattern 404 of the holes 402 can allow the strut 401 to dampen the range of acoustic responses associated with the flow with the VBV cavity 224.

FIG. 4B is an illustration of another example compressor 410 including another example strut 412 including a plurality of holes 414 arranged in an example second pattern 416. In the illustrated example of FIG. 4B, the plurality of holes 414 include an example first hole 418 and an example second hole 420. In the illustrated example of FIG. 4B, the second pattern 416 is such that the holes 414 gradually become larger further downstream. In other examples, the second pattern 416 can be such that the holes 414 gradually become smaller further downstream. In the illustrated example of FIG. 4B, the first hole 418 has a smaller cross-sectional area and is further upstream than the second hole 420. Depending on the material and geometric features of the compressor 400, the second pattern 416 of the holes 402 can allow the strut 412 to dampen the acoustic response associated with the flow with the VBV cavity 224.

FIG. 4C is an illustration of another example compressor 422 including another example strut 424 including a plurality of holes 426 arranged in an example third pattern 428. In the illustrated example of FIG. 4C, the plurality of holes 426 include an example first hole 430, an example second hole 432, and an example third hole 434. In the illustrated example of FIG. 4C, the second pattern 416 is such that the holes 426 alternate in size along the axial axis. In the illustrated example of FIG. 4C, the first hole 430 has a smaller cross-sectional area and is further upstream than the second hole 432, which has a larger cross-sectional area and further upstream than the third hole 434. In other examples, the holes 430, 432, 434 can have any other suitable relationship (e.g., large-small-large, small-small-large, large-large-small, small-large-large, large-large-small, etc.). Depending on the material and geometric features of the compressor 422, the pattern 428 of the holes 418 can allow the strut 424 to dampen the acoustic response associated with the flow with the VBV cavity 224.

The example struts 301, 401, 412, 424 of FIGS. 3-4C can have any suitable cross-sectional structures. For example, the struts 301, 401, 412, 424 can have solid cross-section formed around the plurality of holes (e.g., the holes 302, 402, 414, 426, etc.). In other examples, the struts 301, 401, 412, 424 of FIGS. 3-4C can have a hollow-cross-section and/or partially hollow cross-section. In such examples, the holes 302, 402, 414, 426 described in conjunction with FIGS. 3-4C can be formed in the walls of the struts 301, 401, 412, 424. In some such examples, the inner cavity of struts 301, 401, 412, 424 can include a plurality of sub-cavities with openings therebetween to further tune the acoustic response of the VBV cavity 224. Example cross-sectional structures of the strut 301 taken along the cross-sectional line A-A of FIG. 3 are described below in conjunction with FIGS. 5A and 5B.

Figure 5A:
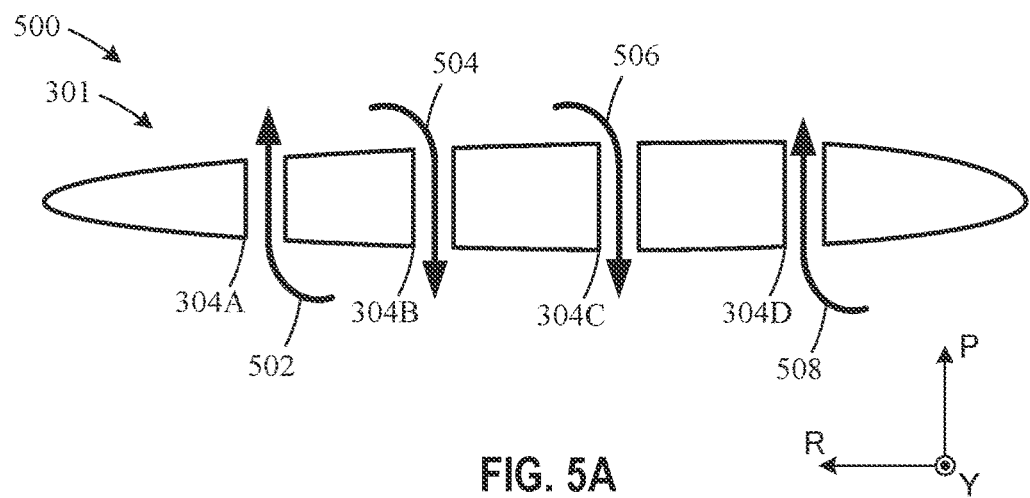
FIG. 5A is an illustration of an example solid cross-section of the strut of FIG. 3.

FIG. 5A is an illustration of an example first cross-sectional structure 500 of the strut 301 of FIG. 3. In the illustrated example of FIG. 3, the cross-sectional structure 500 includes the example first hole 304A of FIG. 3, an example second hole 304B of FIG. 3, the example third hole 304C of FIG. 3, and the example fourth hole 304D of FIG. 3, which enable the flow therethrough of an example first flow 502, an example second flow 504, an example third flow 506, and an example fourth flow 508, respectively. In the illustrated example of FIG. 5A, the flows 502, 504, 506, 508 pass through the holes 304A, 304B, 304C, 304D, respectively, the flows 502, 504, 506, 508 cause the strut 301 and/or other air in the holes 304A, 304B, 304C, 304D to vibrate, which can dampen the overall acoustic response of the strut 301 and/or the VBV cavity 224 (not illustrated). In the illustrated example of FIG. 5A, the cross-sectional structure 500 of the strut 301 is depicted a single integral piece. In other examples, the strut 301 can be composed of two or more separate joined features.

Figure 5B:
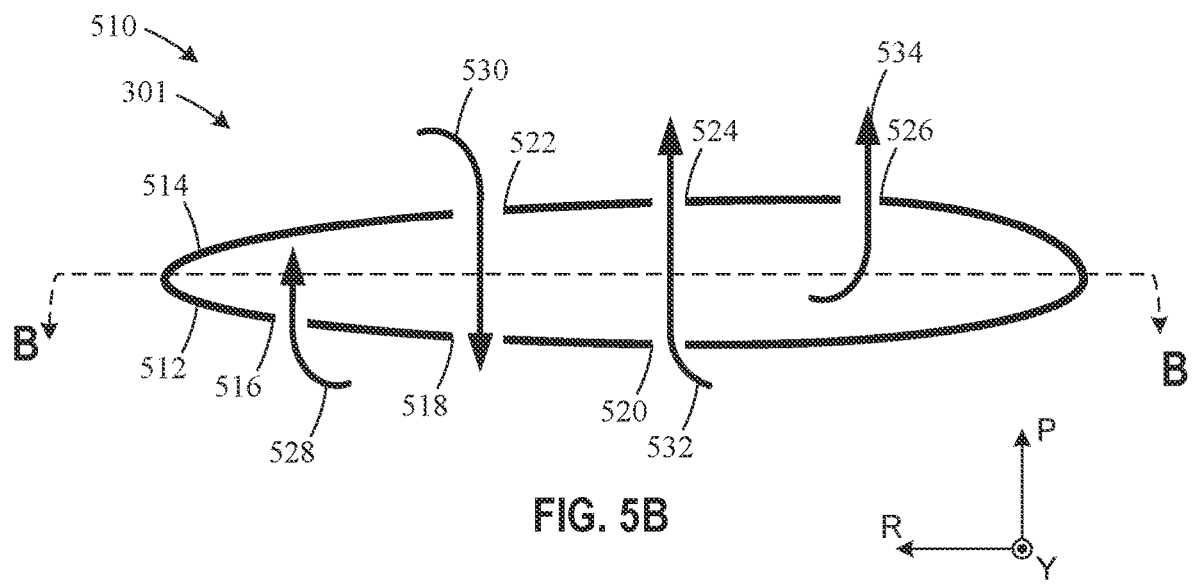
FIG. 5B is an illustration of an example hollow cross-section of the strut of FIG. 3.

FIG. 5B is an illustration of an example second cross-sectional structure 510 of the strut 301 of FIG. 3. In the illustrated example of FIG. 5B, the strut 301 includes an example first side 512 and an example second side 514. In the illustrated example of FIG. 5B, the first side 512 of the second cross-sectional structure 510 includes an example first hole 516, an example second hole 518, and an example third hole 520. In the illustrated example of FIG. 5B, the second side 514 of the second cross-sectional structure 510 includes an example fourth hole 522, an example fifth hole 524, and an example sixth hole 526. In the illustrated example of FIG. 5B, the second cross-sectional structure 510 enables the flow of an example first flow 528, an example second flow 530, an example third flow 532, and an example fourth flow 534, therethrough.

In the illustrated example of FIG. 5B, the holes 516, 526 do not have corresponding circumferential-wise aligned holes on the first side 512 and the second side, respectively. As such, when the flows 528, 534 enter the strut 301 via the holes 516, 526, the air associated with the flows 528, 534 can compress (e.g., causing vibration of the air in the strut 301, etc.) and/or leave via the other holes 518, 520, 522, 524. In some examples, the movement of the flows 528, 534 reduces the energy of the air and dampens the acoustic tone in the bleed cavity 224.

Like the cross-sectional structure 500 of FIG. 5A, the second cross-sectional structure 510 and the flows 528, 530, 532, 534 cause the strut 301 and/or air in the strut 301 to vibrate, which can dampen the overall acoustic response of the strut 301 and/or the VBV cavity 224 (not illustrated). In the illustrated example of FIG. 5B, the second cross-sectional structure 510 is hollow and does not have internal features. In other examples, the second cross-sectional structure 510 can include an internal lattice structure and/or internal sub-cavity structure. Examples of internal structures with internal sub cavities are described below in conjunction with FIGS. 6A and 6B. Additionally or alternatively, the second cross-sectional structure 510 can include a material filler (e.g., epoxy, etc.). In some such examples, the material filler can include channels to accommodate the flows 528, 530, 532, 534.

Figure 6A:
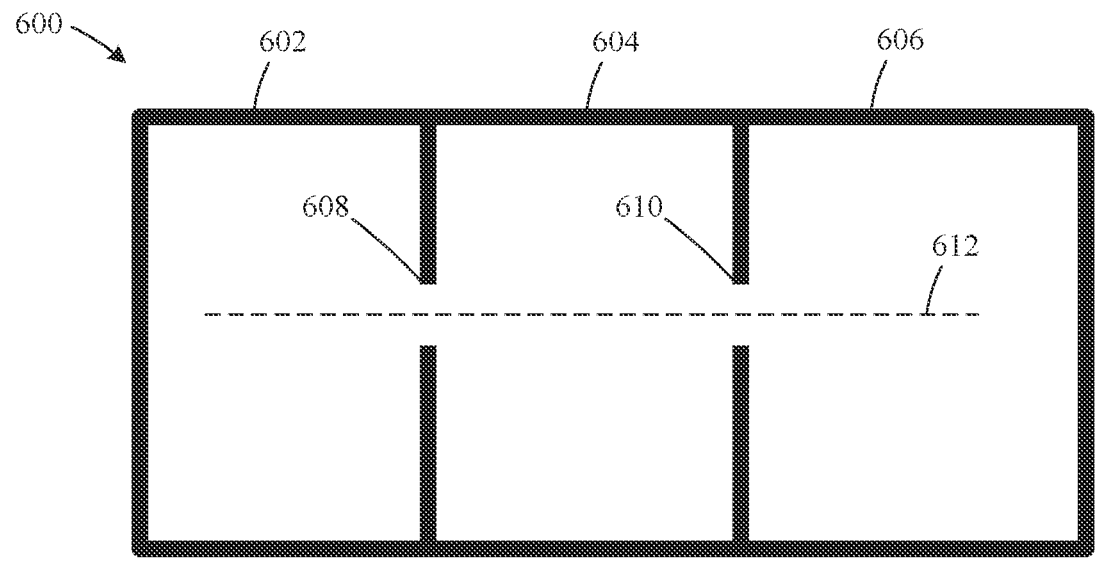
FIG. 6A is an illustration of the strut of FIG. 3 including a first example cavity structure.

FIG. 6A is an illustration of an example first cavity structure 600 that may be used in conjunction with the second cross-sectional structure 510 of FIG. 5B. In the illustrated example of FIG. 6A, the cavity structure 600 includes an example first cavity 602, an example second cavity 604, and an example third cavity 606. In the illustrated example of FIG. 6A, an example first opening 608 is formed between the first cavity 602 and the second cavity 604 and an example second opening 610 is formed between the second cavity 604 and the third cavity 606. In the illustrated example of FIG. 6A, the cavities 602, 604, 606 are polygonal (e.g., quadrilateral, etc.) structures formed with the strut 301 that can be further used to modify the vibrational response associated with the VBV cavity 224. For example, each of the cavities 602, 604, 606 includes a semi-isolated portion of air that can be implemented to vibrate at a particular frequency(ies) based on potentially detrimental frequencies of the VBV cavity 224. The flows 528, 530, 532, 534 (not illustrated) can enter into the cavities 602, 604, 606 via the holes 516, 518, 520, 522, 524, 526 (not illustrated). In the illustrated example of FIG. 6A, the cavities 602, 604, 606 have a same shape. In other examples, the cavities 602, 604, 606 can have different shapes, volumes, geometries, etc.

In the illustrated example of FIG. 6A, the openings 608, 610 acoustically couple (e.g., fluidly couple, etc.) the first cavity 602 to the second cavity 604 and the second cavity 604 to the third cavity 606, respectively. That is, the openings 608, 610 permit flows (e.g., air associated with the flows 528, 530, 532, 534 of FIG. 5B, etc.) to pass between the cavities 602, 604. In the illustrated example of FIG. 6A, an example centerline 612 of the openings 608, 610 are collinear. In the illustrated example of FIG. 6A, the centerline 612 is aligned along the axial axis. In other examples, the centerline 612 can have any other suitable orientation (e.g., parallel but not collinear, skewed, etc.). In the illustrated example of FIG. 6A, the openings 608, 610 are circular. In other examples, the openings 608, 610 can have any other suitable shape (e.g., elliptical, polygonal, etc.).

Figure 6B:
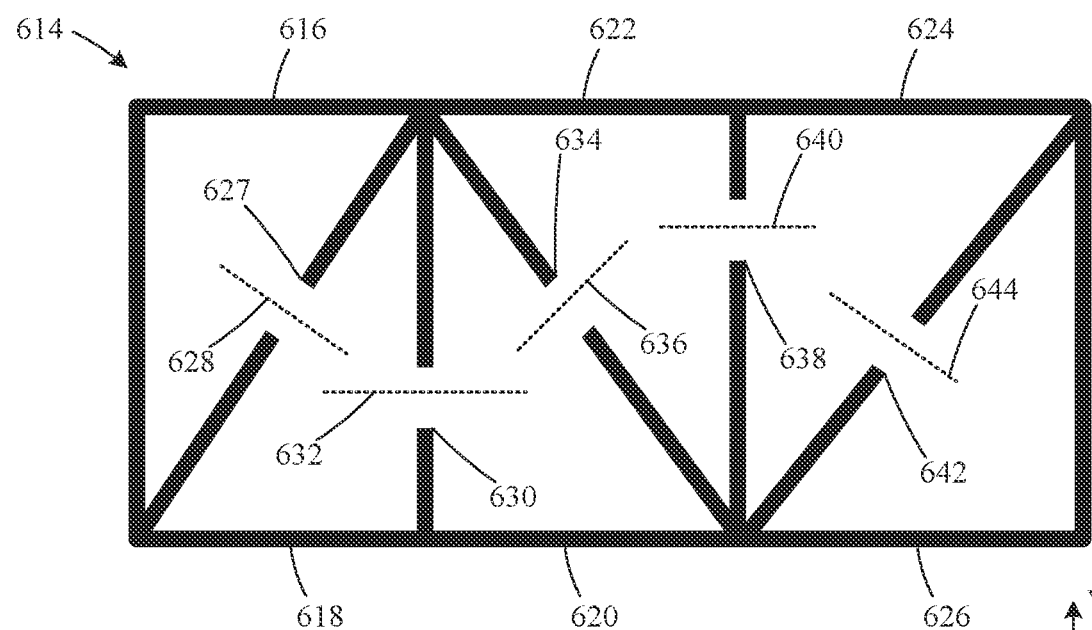
FIG. 6B is an illustration of the strut of FIG. 3 including a second example cavity structure.

FIG. 6B is an illustration of an example second cavity structure 614 that may be used in conjunction with the second cross-sectional structure 510 of FIG. 5B. In the illustrated example of FIG. 6B, the cavity structure 600 includes an example first cavity 616, an example second cavity 618, an example third cavity 620, an example fourth cavity 622, an example fifth cavity 624, and an example sixth cavity 626. In the illustrated example of FIG. 6B, an example first opening 627 having an example first centerline 628 is formed between the first cavity 616 and the second cavity 618. In the illustrated example of FIG. 6B, an example second opening 630 having an example second centerline 632 is formed between the second cavity 618 and the third cavity 620. In the illustrated example of FIG. 6B, an example third opening 634 having an example third centerline 636 is formed between the third cavity 620 and the fourth cavity 622. In the illustrated example of FIG. 6B, an example fourth opening 638 having an example fourth centerline 640 is formed between the fourth cavity 622 and the fifth cavity 624. In the illustrated example of FIG. 6B, an example fifth opening 642 having an example fifth centerline 644 is formed between the fifth cavity 624 and the sixth cavity 626. The flows 528, 530, 532, 534 (not illustrated) can enter into the cavities 616, 618, 620, 622, 624, 626 via the holes 516, 518, 520, 522, 524, 526 (not illustrated).

In the illustrated example of FIG. 6B, the cross-sectional shapes of cavities 616, 618, 620, 622, 624, 626 are polygonal (e.g., triangular, etc.) structures that can be further used to modify the vibrational response associated with the VBV cavity 224. For example, each of the cavities 616, 618, 620, 622, 624, 626 includes a semi-isolated portion of air that can be caused to vibrate at a particular frequency based on cavity volumes and the VBV cavity 224. In the illustrated example of FIG. 6B, the cavities 616, 618, 620, 622, 624, 626 have a same shape and size. In other examples, the cavities 616, 618, 620, 622, 624, 626 can have different shapes and sizes. The openings 627, 630, 634, 638, 642 acoustically couple and/or permit flows (e.g., air associated with the flows 528, 530, 532, 534 of FIG. 5, etc.) to pass between the cavities 616, 618, 620, 622, 624, 626. In the illustrated example of FIG. 6B, the centerlines 628, 632, 636, 640, 644 of the openings 627, 630, 634, 638, 642 are not collinear. In the illustrated example of FIG. 6B, the first centerline 628 is parallel to fifth centerline 644 and the second centerline 632 is parallel to the fourth centerline 640. In other examples, the centerlines can have any other suitable orientations. In the illustrated example of FIG. 6B, the openings 627, 630, 634, 638, 642 are circular. In other examples, the openings 627, 630, 634, 638, 642 can have any other suitable shape (e.g., elliptical, polygonal, etc.).

The struts 301, 401, 412, 424 of FIGS. 3-5B can be disposed within in the VBV cavities 224 during the initial manufacturing/assembly of the casing segments compressor (e.g., via one or more welds, via one or more fasteners, as an integral component with the other parts of the VBVs, via EDM, via laser drilling, etc.). In other examples, the struts 301, 401, 412, 424 of FIGS. 3-5B can be disposed within in the VBV cavities 224 after the assembly and installation of the compressors 300, 400, 410, 422 (e.g., retrofitted into an insisting compressor, etc.). In other examples, the struts 301, 401, 412, 424 of FIGS. 3-5B of FIGS. 3-6B can be formed via casting, additive manufacturing, machining, and/or any other suitable manufacturing technique or combination thereof.

The size of the holes of FIGS. 3-6 (e.g., the plurality of holes 302 of FIG. 3,) are for illustrative purposes only. The actual size of the holes can vary based on the design criteria associated with the specific design needs of the strut and/or VBV cavities. Particularly, holes smaller in size than the holes of FIGS. 3-6 that may be too large to generate the required porosity to provide the acoustic resistance necessary to dampen the cavities.

The illustrated examples of FIGS. 3-6B are cross-sectional views of the compressors 300, 400, 410, 422. It should be understood that the VBV cavities 224 of FIGS. 3-6B can include a plurality of struts similar to the struts 301, 401, 412, 424, respectively, distributed circumferentially in the VBV cavities 224. In some examples, the number of the plurality of the struts can depend on the diameter of the compressors 300, 400, 410, 422, the size of the VBV cavity 224, etc. In some examples, the pattern of holes on each of the plurality of holes can be the same as the plurality of holes of the struts 301, 401, 412, 424. In other examples, the pattern and geometry of the plurality of holes of the additional struts can vary.

Although each example struts 301, 401, 412, 424, cross-sectional structures 500, 510, and the cavity structures 600, 614 disclosed above have certain features, it should be understood that it is not necessary for a particular feature of one of the example struts 301, 401, 412, 424, the cross-sectional structures 500, 510, and the cavity structures 600, 614 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. Features of the struts 301, 401, 412, 424, the cross-sectional structures 500, 510, and the cavity structures 600, 614 disclosed above may be combined, divided, re-arranged, omitted, eliminated, and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that enable manufacture of an advantageous VBV. Examples disclosed herein include struts with through holes and/or internal structures in a VBV cavity. Examples disclosed herein enable a VBV that eliminates or otherwise reduces an acoustic tone generated within a bleed cavity of a VBV port. Accordingly, examples disclosed herein improve aerodynamic efficiency and minimize or otherwise reduce aero-acoustic excitations in the bleed cavity. Examples disclosed reduce stress on booster components and increase part life and time on wing. Examples disclosed herein can be retrofitted (e.g., by installing a strut implemented in accordance with the teachings of this disclosure into existing cases, etc.).

Further aspects of the present disclosure are provided by the subject matter of the following clauses:

Example 1 includes an apparatus comprising a variable bleed valve port, and a strut disposed within the variable bleed valve port, the strut defining a plane and a plurality of holes disposed perpendicularly to the plane, the plurality of holes disposed in a pattern to dampen an acoustic response associated with the variable bleed valve port.

Example 2 includes the apparatus of any preceding clause, wherein the strut has a solid cross-section.

Example 3 includes the apparatus of any preceding clause, wherein the strut has a hollow cross-section including a plurality of fluidly coupled cavities.

Example 4 includes the apparatus of any preceding clause, wherein the plurality of acoustically coupled cavities includes a first polygonal cavity having a first opening, and a second polygonal cavity acoustically coupled to the first polygonal cavity via the first opening, the second polygonal cavity having a second opening, the first polygonal cavity and the second polygonal cavity having a same shape.

Example 5 includes the apparatus of any preceding clause, wherein the first opening defines a first centerline axis, the second opening defines a second centerline axis, and the first centerline axis and the second centerline axis are colinear.

Example 6 includes the apparatus of any preceding clause, wherein the plurality of holes have a same shape and are uniformly spaced about the plane.

Example 7 includes the apparatus of any preceding clause, wherein the plurality of holes includes a first hole having a first cross-sectional area, and a second hole downstream of the first hole, the second hole having a second cross-sectional area, the second cross-sectional area greater than the first cross-sectional area.

Example 8 includes the apparatus of any preceding clause, wherein the plurality of holes includes a first hole having a first cross-sectional area, the first hole adjacent to the first flow path, and a second hole having a second cross-sectional area, the second hole distal from the first flow path, the second cross-sectional area smaller than the first cross-sectional area.

Example 9 includes the apparatus of example 1, wherein the plurality of holes includes a first hole having a first cross-sectional area, a second hole having a second cross-sectional area, the second hole downstream of the first hole, the second cross-sectional area greater than the first cross-sectional area, and a third hole having a third cross-sectional area, the third hole downstream of the first hole and the second hole, the second cross-sectional area greater than the third cross-sectional area.

Example 10 includes the apparatus of example 1, wherein the plurality of holes cause the strut to act as one or more Helmholtz resonators.

Example 11 includes a gas turbine engine comprising a compressor, a variable bleed valve port disposed in the compressor, and a strut disposed within the variable bleed valve port, the strut defining a plane and a plurality of holes disposed perpendicularly to the plane, the plurality of holes disposed in a pattern to dampen an acoustic response associated with the variable bleed valve port.

Example 12 includes the gas turbine engine of example 11, wherein the strut has a solid cross-section.

Example 13 includes the gas turbine engine of example 11, wherein the strut has a hollow cross-section including a plurality of fluidly coupled cavities.

Example 14 includes the gas turbine engine of example 13, wherein the plurality of acoustically coupled cavities includes a first polygonal cavity having a first opening, and a second polygonal cavity acoustically coupled to the first polygonal cavity via the first opening, the second polygonal cavity having a second opening, the first polygonal cavity and the second polygonal cavity having a same shape.

Example 15 includes the gas turbine engine of example 14, wherein the first opening defines a first centerline axis, the second opening defines a second centerline axis, and the first centerline axis and the second centerline axis are colinear.

Example 16 includes the gas turbine engine of example 11, wherein the plurality of holes have a same shape and are uniformly spaced about the plane.

Example 17 includes the gas turbine engine of example 11, wherein the plurality of holes includes a first hole having a first cross-sectional area, and a second hole downstream of the first hole, the second hole having a second cross-sectional area, the second cross-sectional area greater than the first cross-sectional area.

Example 18 includes the gas turbine engine of example 11, wherein the plurality of holes includes a first hole having a first cross-sectional area, the first hole adjacent to the first flow path, and a second hole having a second cross-sectional area, the second hole distal from the first flow path, the second cross-sectional area smaller than the first cross-sectional area.

Example 19 includes the gas turbine engine of example 11, wherein the plurality of holes includes a first hole having a first cross-sectional area, a second hole having a second cross-sectional area, the second hole downstream of the first hole, the second cross-sectional area greater than the first cross-sectional area, and a third hole having a third cross-sectional area, the third hole downstream of the first hole and the second hole, the second cross-sectional area greater than the third cross-sectional area.

Example 20 includes the gas turbine engine of example 11, wherein the plurality of holes cause the strut to act as one or more Helmholtz resonators. Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a variable bleed valve port defining a bleed flow path, the variable bleed valve port including:
an edge adjacent to a casing of a gas turbine engine; and
a port exit downstream of the edge along the bleed flow path;
a variable bleed valve door positioned at the port exit, the variable bleed valve door and the edge defining a bleed cavity when the variable bleed valve door is closed, the bleed cavity open to a main flow path of the engine; and
a strut disposed within the bleed cavity, the strut defining a plane and a plurality of holes disposed perpendicularly to the plane, the plurality of holes disposed in a pattern to dampen an acoustic response associated with the bleed cavity.

2. The apparatus of claim 1, wherein the strut has a solid cross-section.

3. The apparatus of claim 1, wherein the strut has a hollow cross-section including a plurality of fluidly coupled cavities.

4. The apparatus of claim 3, wherein the plurality of fluidly coupled cavities includes:
a first polygonal cavity having a first opening; and
a second polygonal cavity acoustically coupled to the first polygonal cavity via the first opening, the second polygonal cavity having a second opening, the first polygonal cavity and the second polygonal cavity having a same shape.

5. The apparatus of claim 4, wherein the first opening defines a first centerline axis, the second opening defines a second centerline axis, and the first centerline axis and the second centerline axis are colinear.

6. The apparatus of claim 1, wherein the plurality of holes have a same shape and are uniformly spaced about the plane.

7. The apparatus of claim 1, wherein the plurality of holes includes:
a first hole having a first cross-sectional area; and
a second hole downstream of the first hole, the second hole having a second cross-sectional area, the second cross-sectional area greater than the first cross-sectional area.

8. The apparatus of claim 1, wherein the plurality of holes includes:
a first hole having a first cross-sectional area, the first hole adjacent an entry of the variable bleed valve port; and
a second hole having a second cross-sectional area, the second hole distal from the entry, the second cross-sectional area smaller than the first cross-sectional area.

9. The apparatus of claim 1, wherein the plurality of holes includes:
a first hole having a first cross-sectional area;
a second hole having a second cross-sectional area, the second hole downstream of the first hole, the second cross-sectional area greater than the first cross-sectional area; and a third hole having a third cross-sectional area, the third hole downstream of the first hole and the second hole, the second cross-sectional area greater than the third cross-sectional area.

10. The apparatus of claim 1, wherein the plurality of holes cause the strut to act as one or more Helmholtz resonators.

11. A gas turbine engine comprising:
a compressor casing;
a variable bleed valve port disposed in the compressor, the variable bleed valve port including:
an edge adjacent to the compressor casing; and
a port exit downstream of the edge along a bleed flow path;
a variable bleed valve door positioned at the port exit, the variable bleed valve door and the edge defining a bleed cavity when the variable bleed valve door is closed, the bleed cavity open to a main flow path of the engine; and
a strut disposed within the bleed cavity, the strut defining a plane and a plurality of holes disposed perpendicularly to the plane, the plurality of holes disposed in a pattern to dampen an acoustic response associated with the bleed cavity.

12. The gas turbine engine of claim 11, wherein the strut has a solid cross-section.

13. The gas turbine engine of claim 11, wherein the strut has a hollow cross-section including a plurality of fluidly coupled cavities.

14. The gas turbine engine of claim 13, wherein the plurality of fluidly coupled cavities includes:
a first polygonal cavity having a first opening; and
a second polygonal cavity acoustically coupled to the first polygonal cavity via the first opening, the second polygonal cavity having a second opening, the first polygonal cavity and the second polygonal cavity having a same shape.

15. The gas turbine engine of claim 14, wherein the first opening defines a first centerline axis, the second opening defines a second centerline axis, and the first centerline axis and the second centerline axis are colinear.

16. The gas turbine engine of claim 11, wherein the plurality of holes have a same shape and are uniformly spaced about the plane.

17. The gas turbine engine of claim 11, wherein the plurality of holes includes:
a first hole having a first cross-sectional area; and
a second hole downstream of the first hole, the second hole having a second cross-sectional area, the second cross-sectional area greater than the first cross-sectional area.

18. The gas turbine engine of claim 11, wherein the plurality of holes includes:
a first hole having a first cross-sectional area, the first hole adjacent an entry of the variable bleed valve port; and
a second hole having a second cross-sectional area, the second hole distal from the entry, the second cross-sectional area smaller than the first cross-sectional area.

19. The gas turbine engine of claim 11, wherein the plurality of holes includes:
a first hole having a first cross-sectional area;
a second hole having a second cross-sectional area, the second hole downstream of the first hole, the second cross-sectional area greater than the first cross-sectional area; and a third hole having a third cross-sectional area, the third hole downstream of the first hole and the second hole, the second cross-sectional area greater than the third cross-sectional area.

20. The gas turbine engine of claim 11, wherein the plurality of holes cause the strut to act as one or more Helmholtz resonators.

* * * * *